UNITED STATES PATENT OFFICE.

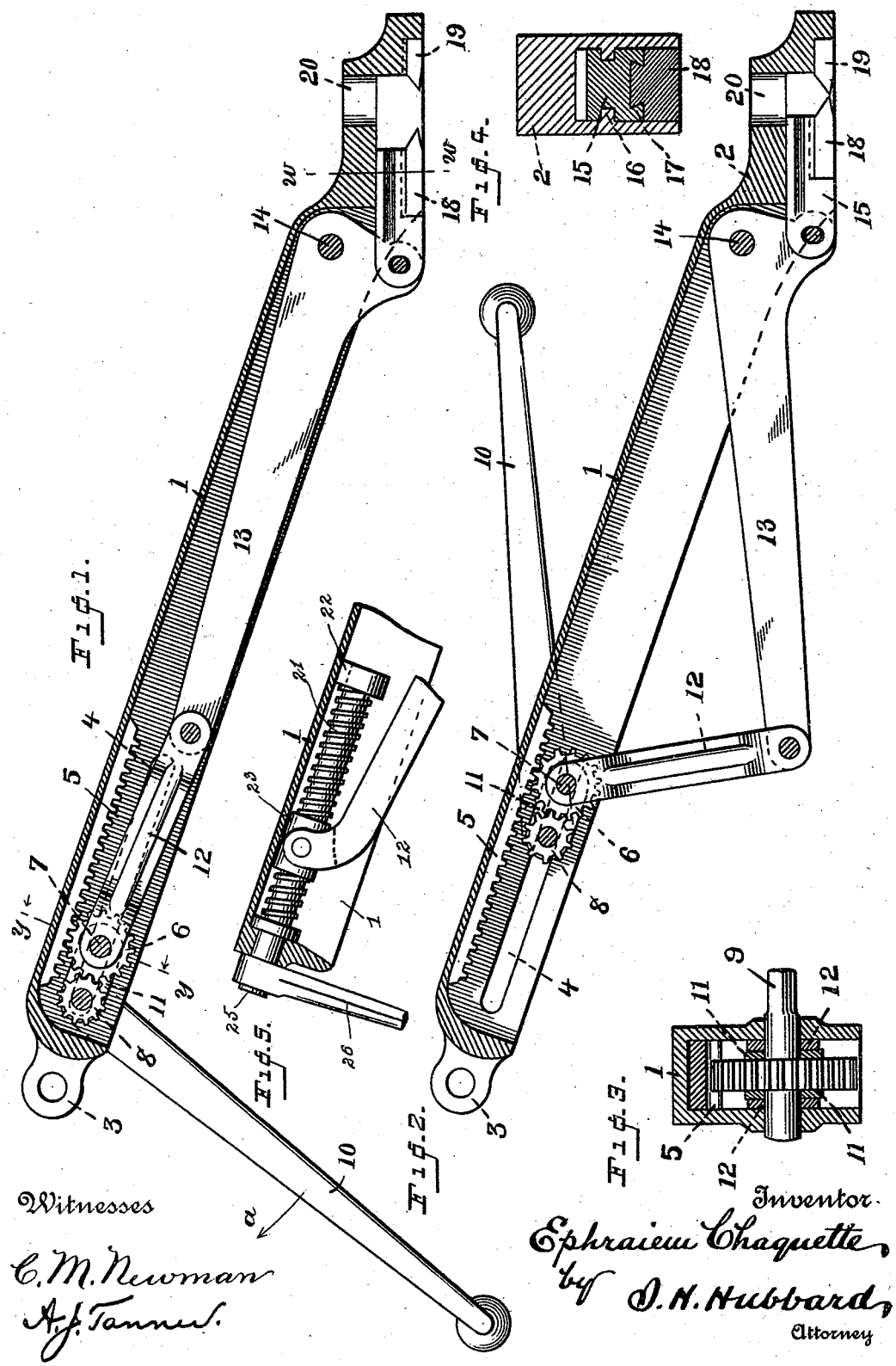

EPHRAIEM CHAQUETTE, OF SAN FRANCISCO, CALIFORNIA.

BOLT OR ROD CUTTER.

SPECIFICATION forming part of Letters Patent No. 496,396, dated May 2, 1893.

Application filed July 11, 1892. Serial No. 439,592. (No model.)

*To all whom it may concern:*

Be it known that I, EPHRAIEM CHAQUETTE, a citizen of the United States, residing at San Francisco, in the county of San Francisco and State of California, have invented certain new and useful Improvements in Bolt or Rod Cutters; and I do hereby declare the following to be a full, clear, and exact description of the invention, such as will enable others skilled in the art to which it appertains to make and use the same.

This invention relates to certain new and useful improvements in bolt cutters, and is particularly designed for use in cutting off bolts, rod-iron and steel, such as boiler rivets, carriage bolts and the like, and the object of my invention is to provide a tool of this description which shall be simple in construction and cheap to manufacture, which shall be portable, and which shall be capable of applying very great power to the closing of the cutting jaws upon the work to be severed; and with these ends in view my invention consists and resides in the construction and combination of co-operating elements hereinafter to be fully and in detail set forth and then recited in the claims.

In order that those skilled in the art to which my invention appertains may fully understand its construction and method of operation, I will proceed to describe the same in detail, reference being had to the accompanying drawings which form a part of this specification, and in which, Figure 1, is a longitudinal vertical sectional elevation showing the parts in position to commence operations; Fig. 2, a similar view showing the tool at the time the cutting-off operation is completed. Fig. 3, is a section at the line $y-y$ of Fig. 1. Fig. 4, is a section at the line $w-w$ of Fig. 1. Fig. 5, shows a modified means for actuating the toggle levers.

The same numerals denote the same parts in each of the figures.

The body or frame, or stock of my device consists of a U-shaped bar 1 having secured thereon or formed integral therewith at its outer end a cutter head 2. At its proximal end I prefer to provide it with a ring or eye 3 whereby it may be hung up.

In the sides of the bar 1 I form two slots 4 which serve as guideways for the purpose presently to be explained, and in the top of the bar I form or secure a straight rack 5 having its teeth depending, as shown in the several figures.

6 is a gear whose axis 7 projects through and runs in the slots 4 in the sides of the bar, and the teeth upon said gear mesh with the rack just referred to. Behind this gear is another gear 8 smaller in diameter so as to clear the rack teeth and arranged to mesh with the gear 6. This gear is provided upon the ends of its axis with a key 9 for the attachment of a crank 10. The two gears just referred to have their axes secured together by links 11 so that they can not disengage. Inside the bar the axis 7 of the gear 6 has pivoted thereon one end of a link 12 which is preferably bifurcated, and the other end of this link is pivotally connected to a lever 13 whose elbow is fulcrumed at its lower end near the cutter head, as is shown at 14. The shorter arm of this lever is pivotally connected with a cutter-carrier 15 which slides in ways 16 formed in the cutter head in such manner that it may be thrust forward or retracted by the movement of the lever 13. This cutter carrier has a dove-tailed slide 17 in it and is adapted to contain a cutting jaw 18 which is provided with a suitable dove-tail. The other side of the cutter head is also provided with a dove-tailed slide for the reception of a cutter 19 which forms the stationary cutting jaw. The top of the cutter head is perforated, as seen at 20, to admit of the passage therethrough of long rods or bolts. I prefer to seat the cutters in slide-ways as just described, so that they may be readily removable for sharpening or the insertion of other cutters.

The operation of my invention is as follows: When the parts are in the position shown at Fig. 1 the bolt or rod is introduced between the cutting jaws and then the operator turns the crank in the direction shown by the arrow *a* at Fig. 1. This rotates the gear 8, which in turn applies power to the gear 6, and, as the teeth on said gear 6 mesh with the rack 5, the movement will cause the two gears to travel down the slots in which they have their bearing toward the position in which they are shown at Fig. 2. This movement through the link 12 throws the lever 13 downward, whereby the movable cutting jaw is advanced slowly but with great force toward the stationary jaw, and the bolt between them is severed. A reversal of the movement of the crank will again separate the jaws and carry the several parts back to the position in which they are shown at Fig. 1. For a variety of reasons I give preference to the construction shown in Figs. 1 and 2, but as a modification thereof I show in Fig. 5 a construction wherein the gears and rack are replaced by a screw 21 whose ends are journaled respectively in a lug 22 and a bearing formed in the end of the bar. Upon this screw runs a traveler or nut 23 having trunnions or similar means of attachment for the end of the link 12. The outer end of the screw bears a key 25 adapted for operation by means of a crank 26. The method of operation of this modified construction is so obvious that no detail description thereof is required.

I claim—

1. In a device of the character described, the combination with a fixed jaw and a movable co-operating jaw, of a primary lever for the actuation of the movable jaw, a secondary lever pivoted at one end to the primary lever and having a sliding bearing as to its other end, and means as described for advancing or retracting the sliding end of the secondary lever.

2. In a bolt cutter, a stock or body having attached thereto a cutter head, in combination with a stationary and a movable cutter, a primary lever fulcrumed within the body and adapted to operate the movable cutter, a secondary lever or link fulcrumed at one end of the primary lever and at the other end to a sliding part within the body, and means as described for imparting to said sliding part a movement longitudinal of the body, substantially as and for the purpose specified.

3. In a bolt or rod cutter, a stock or body having a cutter head, in combination with a stationary and a movable cutting jaw, a primary lever for the operation of the movable cutting jaw, a secondary lever attached to said primary lever a rotative gear connected to said secondary lever, a slideway for said gear, a stationary rack with which said gear engages, and means for the rotation of the gear.

4. In a bolt or rod cutter, the combination with the stock or body provided with a stationary rack and bearing a cutter head, of a movable and a stationary cutter, a primary lever for the operation of the movable cutter, a secondary lever for the operation of the primary lever, a gear connected to said secondary lever and meshing with the stationary rack, a slide-way for said gear, and a secondary gear provided with a crank and meshing with and adapted to rotate the gear on the secondary lever, the whole arranged substantially as described.

In testimony whereof I affix my signature in presence of two witnesses.

EPHRAIEM CHAQUETTE.

Witnesses:
S. H. HUBBARD,
A. J. TANNER.